United States Patent
Piunno

(10) Patent No.: US 9,250,882 B2
(45) Date of Patent: Feb. 2, 2016

(54) METHOD AND SYSTEM FOR IMPLEMENTING IN-APP SOFTWARE DEVELOPMENT KITS

(71) Applicant: Buongiorno S.p.A., Parma (IT)
(72) Inventor: Simone Piunno, Parma (IT)
(73) Assignee: BUONGIORNO S.P.A., Parma (IT)
(*) Notice: Subject to any disclaimer, the term of this patent is extended or adjusted under 35 U.S.C. 154(b) by 0 days.

(21) Appl. No.: 14/582,668
(22) Filed: Dec. 24, 2014
(65) Prior Publication Data
US 2015/0186123 A1 Jul. 2, 2015

Related U.S. Application Data

(60) Provisional application No. 61/921,287, filed on Dec. 27, 2013.

(51) Int. Cl.
- *G06F 9/44* (2006.01)
- *G06F 9/445* (2006.01)
- *G06Q 10/00* (2012.01)
- *G06Q 30/00* (2012.01)

(52) U.S. Cl.
CPC .. *G06F 8/54* (2013.01); *G06F 8/20* (2013.01); *G06F 8/60* (2013.01); *G06Q 10/00* (2013.01); *G06Q 30/00* (2013.01)

(58) Field of Classification Search
CPC ............... G06F 8/60; G06F 8/54; G06F 8/20
USPC ....................................................... 717/163
See application file for complete search history.

(56) References Cited

U.S. PATENT DOCUMENTS

| | | | | |
|---|---|---|---|---|
| 8,595,489 B1* | 11/2013 | Faaborg | ............... | H04W 12/02 713/166 |
| 8,606,720 B1* | 12/2013 | Baker | ............... | G06Q 20/00 705/64 |
| 8,698,824 B1* | 4/2014 | Wang | ............... | G06T 17/05 345/522 |
| 2006/0265325 A1* | 11/2006 | Fajardo | ............... | G06Q 20/04 705/40 |
| 2009/0070257 A1* | 3/2009 | Csoka | ............... | G06Q 20/10 705/39 |
| 2011/0153697 A1* | 6/2011 | Nickolov | ............... | G06F 9/4856 707/827 |
| 2011/0154305 A1* | 6/2011 | LeRoux | ............... | G06F 8/71 717/140 |
| 2012/0089521 A1* | 4/2012 | Abrevaya | ............... | G06Q 20/401 705/75 |
| 2013/0024851 A1* | 1/2013 | Firman | ............... | G06F 8/71 717/170 |
| 2013/0132235 A1* | 5/2013 | Gandhi | ............... | G06Q 30/0601 705/26.41 |
| 2013/0232540 A1* | 9/2013 | Saidi | ............... | G06F 21/6218 726/1 |
| 2013/0246259 A1* | 9/2013 | Dessert | ............... | G06Q 20/367 705/41 |
| 2014/0129512 A1* | 5/2014 | Kawecki, III | ............... | G06F 17/30867 707/607 |
| 2015/0150025 A1* | 5/2015 | Yuen | ............... | G06F 9/54 719/312 |
| 2015/0186123 A1* | 7/2015 | Piunno | ............... | G06F 8/54 717/163 |

* cited by examiner

*Primary Examiner* — Don Wong
*Assistant Examiner* — Theodore Hebert
(74) *Attorney, Agent, or Firm* — Arent Fox LLP

(57) ABSTRACT

The invention refers to technical methods and systems to easily provide existing software applications, for example Android applications built for In-App Billing with Google Play application programming interface ("API"), with compatibility with other alternative payment platforms, preferably direct carrier billing, with no additional development effort.

3 Claims, 2 Drawing Sheets

METHOD AND SYSTEM FOR IMPLEMENTING IN-APP SOFTWARE DEVELOPMENT KITS

CROSS-REFERENCE TO RELATED APPLICATIONS

This application is based upon and claims the benefit of priority to U.S. Provisional Application No. 61/921,287, filed Dec. 27, 2013. The disclosure of the prior application of which is hereby incorporated in its entirety by reference.

FIELD OF THE INVENTION

The present invention relates to methods for the development of proprietary software development kits (hereafter, "SDKs") to enable existing software applications (hereafter, "apps"), preferably Android apps, to plug in to alternative app payment methods, and specifically direct carrier billing functionalities, thus being able to distribute said apps out of a single app market store (for example in alternative markets to Google Play store) with effortless integration. The invention also relates to systems configured for implementing said methods.

BACKGROUND OF THE INVENTION

Google Play is an app marketplace managed by Google where users can upload their Android-compatible applications. Third party developers using Android software development toolkit can build applications as packaged binary application package files ("APKs") and upload them to Google Play store for distribution to end users.

Through Google Play those apps can be found by end users, downloaded and installed on Android-based devices. Google additionally provides a set of services useful to implement common functionalities in Android apps, such as messaging, asynchronous notification, application upgrade, and in-app payment. We will call these as "Proprietary Google Services" or PGS. The same typically applies to other proprietary services ("PS") owned by other companies.

Google Play is not the only possible distribution platform for Android apps. There are alternative marketplaces such as Amazon Store and alternative payment methods. Developers that want to also distribute through these alternative channels are forbidden to use PGS and therefore have to build a different APK package linked to alternative implementations of those services. This requires additional development efforts that usually discourage the use of alternative platforms and becomes a technical barrier to Google competitors.

BRIEF DESCRIPTION OF THE INVENTION

The present invention provides a proprietary SDK development method to build alternative APK files with automated algorithms to dynamically change behavior depending on context (such as country, mobile operator or required "opt-in" flow) and minimal effort for the developer, simplifying the technical process to publish Android applications in alternative distribution channels.

One object of the invention refers to a method for implementing in-app software development kits comprising:
  implementing application logics in a programming language compatible with a virtual machine operating system;
  providing one or more proprietary support libraries provided by a first service provider;
  using a software development environment to link the application logics and the proprietary support libraries together, and package them into an APK binary;
  uploading the APK binary to an app market store associated to the first service provider;
wherein the method further comprises at least the following steps:
  including additional proprietary support libraries provided by second service providers implementing integration with alternative distribution channels in place of the ones provided by the first service provider;
  using the said software development environment to link the application logics and the additional proprietary support libraries together in further APK binaries that can be uploaded to alternative app market stores.

In a preferred embodiment of the invention, the additional proprietary support libraries included comprise one or more of the following function methods:
  function method to determine if a payment is supported depending on the country, the mobile operator and/or the purchase type;
  function method to return a list of product identifiers of already purchased items and their details, and/or to know if an item has been already purchased;
  function method to return a list of all items that can be purchased and their details including price, title, description and purchase type;
  function method to start a purchase flow and allow user interaction within the app;
  function method to mark a purchase as consumed and/or allowing additional purchases of the same item.

A further object of the invention refers to a system for implementing in-app software development kits comprising software, hardware and/or middleware means configured to carry out a method according to any of the embodiments described in the present document.

In a preferred embodiment of the invention, the system comprises a server middleware implemented on a cluster of application servers, configured to dispatching commands to one or more of the following components:
  database of inventory items for an app in a market store;
  database of purchased items for each app and user in a market store;
  definition means of purchase flow for a mobile operator and associated payment method;
  finite-state machine implementing purchase flow through a purchase session;
  database of ongoing purchase sessions and their status;
  connectors and protocol adaptors for a mobile operator and associated payment method;
  JSON API used by SDK;
  reporting log for stats;
  audit trail.

As an example related to Google proprietary services (although also applicable to other app proprietary services by introducing the corresponding modifications related to programming languages, operating systems, and specific market store specifications and APK requirements), the technical process involved in producing an APK file for upload to Google Play includes the following steps:
  a) Developer has to implement the application logic in Java programming language compatible with Dalvik virtual machine operating system.
  b) Developer has to include proprietary support libraries provided by Google.
  c) Using a software development environment the two parts are linked together and packaged in an APK binary.

d) The APK binary is uploaded to Google Play.

The method of the invention also includes at least the following steps:

e) Developer includes additional proprietary support libraries implementing integration with alternative distribution channel in place of the ones provided by Google in step (b)

f) Using same software development environment of step (c) the parts are re-linked together in a new APK binary that can be uploaded to an alternative store.

Through this method, a competitor of Google in the field of Android apps distribution can easily convince application developers to engage in distribution in the competitor's marketplace.

DETAILED DESCRIPTION OF THE INVENTION

Figure 1:
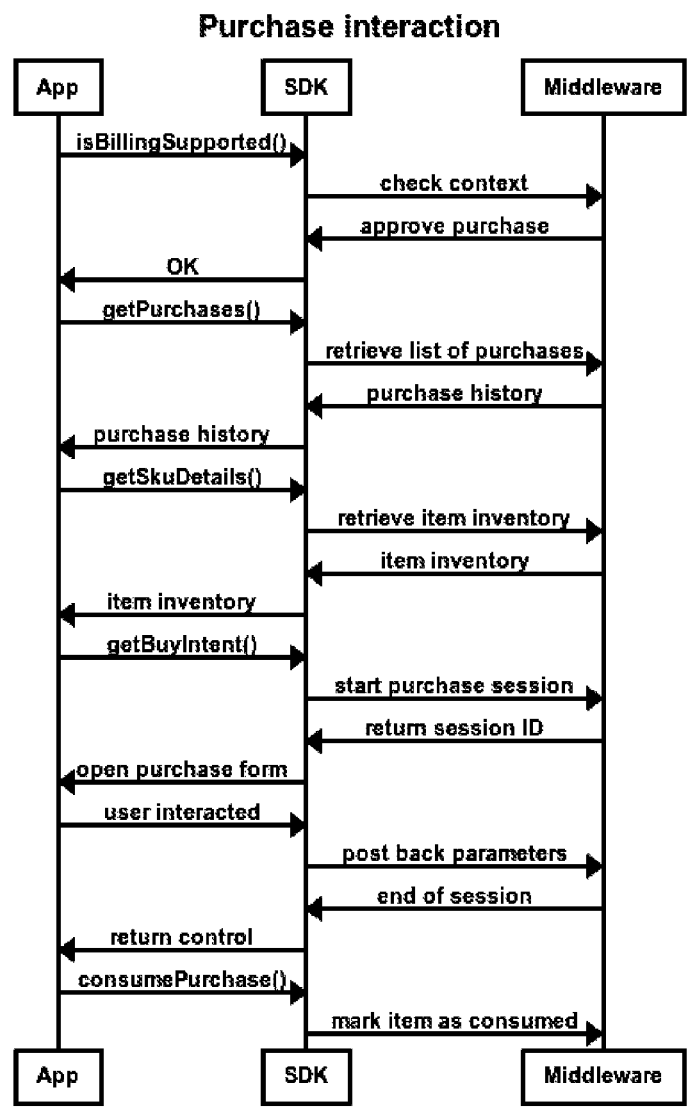
FIG. 1 shows a sequence diagram depicting the steps of a purchasing process according to an embodiment of the invention.

As an example related to an embodiment of the invention applied to proprietary Google services, the proposed method can be implemented through at least one support library that is compatible at application programming interface ("API") level with the one provided by Google Play, plus a server side platform implementing functionalities similar to the ones provided by Google for instance for in-app payment. Those functionalities can be connected to different back-ends and, for example, the in-app payment can be implemented with operator billing instead of credit card transactions. The support library will preferably comprise the following function methods (see FIG. 1 for an example of a complete purchasing process according to the invention):

IsBillingSupported( )—Function method to determine if a payment is supported depending on context (country, mobile operator, purchase type).

GetPurchases( )—Function method to return a list of ProductIDs of already purchased items and their details, or to know if an item was already purchased.

GetSkuDetails( )—Function method to return a list of all items that can be purchased and their details including price, title, description and purchase type.

GetBuyIntent( )—Function method to start a purchase flow and allow user interaction within the app.

ConsumePurchase( )—Function method to mark a purchase as consumed and allow additional purchases of the same item (when the item is configured as consumable).

Figure 2:
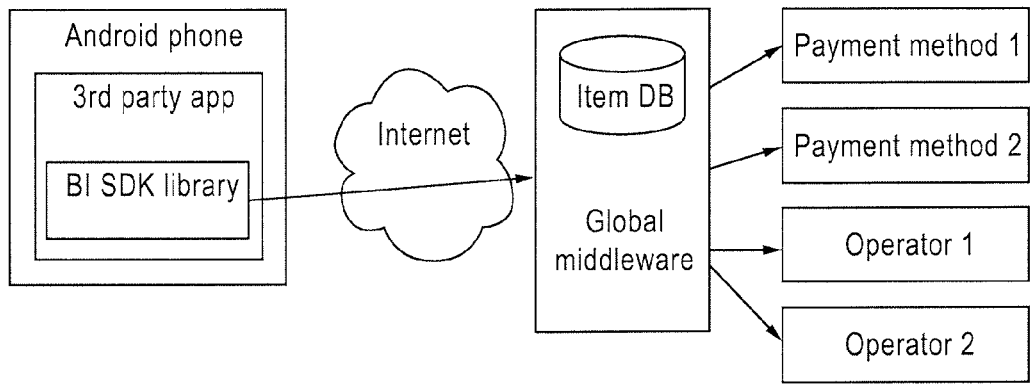
FIG. 2 shows an embodiment of the SDK and Middleware architecture according to an embodiment of the present invention.

Through the above function methods, the support API will interact with a Global Server Middleware (see FIG. 2 for an example of the SDK and Middleware architecture according to the invention) which is a server system connected via JSON/REST queries over the network. This system is implemented on a cluster of application servers dispatching commands to different backend components and payment providers. All communications will be protected and encrypted with HTTPS protocol, using a pair of public-key generated certificates where the public key will part of the support library files and the private key stored on the global middleware servers.

The IsBillingSupported( ) function can be implemented collecting information from the operating system of a phone (such as the IMSI code of a SIM card) or the IP address and with this parameters calling the middleware to compute which country and operator the user belongs to, who is the user (for example via 3G number recognition or mapping IMSI to MSISDN or to email address with a database lookup) and if ultimately the kind of transaction (one-off or subscription) is allowed in this context. This call also allows identifying the user and having authorization codes needed for the other methods.

The global middleware manages tables with the inventory of purchasable items for each app, separate price tables for each mobile operator, lists of already purchased items for each user of each app, lists of installed apps.

The GetPurchases( ) and GetSkuDetails( ) methods can be implemented calling the middleware to lookup the inventory tables and the item details and reporting a JSON document with the list of all the items owned by the user. Users are identified by their email account (provided by Android operating system) and applications are identified by their package name string and certificate. The combination of the three elements defines the set of items to be extracted by the tables.

The global middleware also maintains connections with core network and payment systems of several mobile operators in many countries, implementing their proprietary communication protocols and automatically adapting the communication so that all operators are presented to the support library as one unique and uniform API. The purchase flow is described in these API as a finite state machine with arbitrary number of steps, where is step represent one input action requested to the user in the opt-in flow.

In an embodiment of the invention, the middleware contains the following components:

Database of inventory items for each app.

Database of purchased items for each app and user.

Definition of purchase flow for each operator and payment method.

Finite-state machine implementing purchase flow through a session.

Database of ongoing purchase sessions and their status.

Connectors and protocol adaptors for each operator and payment method.

JSON API used by SDK.

Reporting log for stats.

Audit trail.

The GetBuyIntent( ) calls the middleware to start a purchase session, passing the stock-keeping unit (SKU) of the item to be purchased and receiving a session. User interaction is managed with an Android Activity implemented in the support library as either a native form or a webview. The session is contextualized to the particular payment method and mobile operator and the look and feel of the form adapted accordingly. The support library can call the middleware at every step to send acquired information to the server and get back instructions on what needs to be performed in the next step (what kind of form comes next, which information is to be acquired in order to proceed). Obtained information is incrementally stored at the middleware end in a session table and only when the set is complete the transaction is performed sending appropriate commands (different for each payment method and mobile operator) to the relevant backends. When the session is complete the middleware will return a success code and the purchase Activity will close, returning control to the game.

The ConsumePurchase( ) method can be implemented with a call to the middleware with the Sku ID and will make the item as used so that in the table of items owned by the user it will no longer appear as owned and a new purchase for that Sku ID will become possible. This is particularly useful for those items that are "consumable" or "repeatable", meaning that users can buy them more than once.

A server side administration interface can provide to the developer the ability to configure parameters of the additional distribution method, or the ability to auto-provision the APK binary in the alternative store. A white-label version of this administration interface can power different marketplaces under different brands.

Some examples of the actions that can be performed through the admin interface are:
  Extraction of reports on the installed apps, activity of the users, payment transactions by hour or day.
  Reading the list of apps configured by a developer.
  Configuring the list of countries where a given app is approved for distribution.
  Reading and changing the inventory table of purchasable items for a given app and country, with parameters such as item type (subscription, repeatable, non repeatable), price, title, description, SKU.
  Creating a new app profile (with title, app ID, package name, certificate pair)
  Uploading a new APK for a given app.
  Publishing an APK to a given URL.
  Sending messages to installed apps, for example to trigger an upgrade.

In particular for in-app payment based on operator billing, additional complexity has to be addressed because different operators require different purchase experience flows and they frequently change the requirements to comply with ever changing national policies and regulations.

An application meant for global distribution would be connected with more than 100+ different operators all requiring slightly different flows. Each of those operators would usually update the local requirements on a yearly basis meaning that the set of flows built in the app has to be updated very often.

Figure 3:
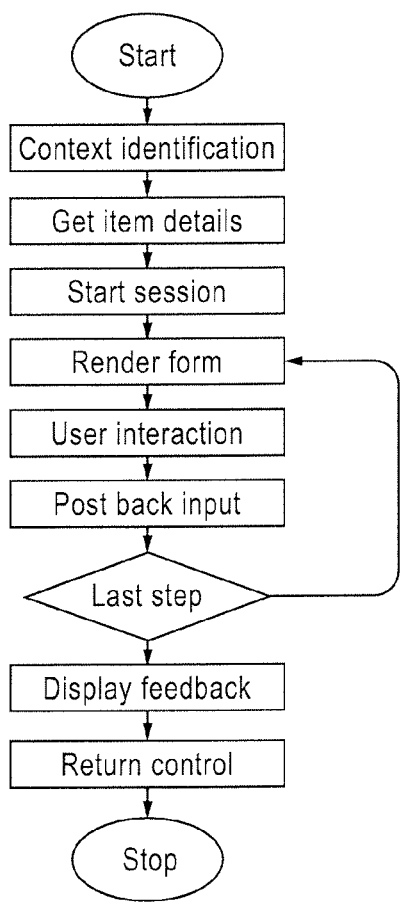
FIG. 3 shows a sequence diagram depicting a purchase session according to an embodiment of the invention.

The support library can overcome this complexity by dynamically loading step-by-step instructions on the specific purchase experience flow required by the operator that the phone running the app is connected to and automatically adapting the purchase experience to comply with local regulation. A typical session (FIG. 3) might go through these steps:
  1. Calling middleware to identify the context (country, operator, available payment methods).
  2. Calling middleware to identify parameters of the item to be purchased (name, description, and price).
  3. Starting a purchase session to track the steps and getting the list of parameters for the first steps like type of form to be displayed, strings and image logos to be filled in the for template, name of the input field to be collected, for example a form to show the user his phone number, name and price of the item to be purchased, indication of the legal terms and conditions of the purchase, privacy disclaimer, and an OK button to approve.
  4. Rendering the form as dynamically defined in the previous step.
  5. Waiting for the user to interact with the form performing the requested action (clicking a button, tapping an area of the screen, filling a field, etc), for example tapping on the OK button.
  6. Posting back to the middleware the acquired input field and getting information on the next step to be performed, looping back to #4 or, if there is no next step, moving to #7
  7. Displaying appropriate feedback to the user about success or failure of the transaction, with strings and images dynamically selected in step #6.

This way the purchase experience is automatically localized, up-to-date with latest policies and works with variable number and type of steps depending on context.

All PGS can be implemented in the alternative support library as fully compatible alternative implementation making the app fully functional outside of Google Play marketplace.

The support library will automatically detect country and mobile operator of the handset querying the operating system API to retrieve IMSI code and decompose that in Mobile Country Code and Mobile Network Code according to ITU standards.

Using this information the support library will automatically relate the handset to a particular mobile operator and reconfigure the purchase experience according to the technical capabilities and the policy requirements of that mobile operator. This might include for example:
  Changing graphical layout of the opt-in form
  Adding logo and name of the mobile operator
  Changing language of the text displayed
  Displaying a different text for legal terms & conditions and privacy
  Selecting a different price point for the item being purchased
  Offering a different purchase flow (one-click, two clicks, etc.)
  Selecting a different identification method (3G, via headers, with SMS triangulation, etc.)

When needed, user identification will be performed automatically by the support library without any need of user interaction, using these steps:
  Support library calls the middleware server to open a triangulation session and receives a unique random-generated session code
  Support library sends an MT SMS to a special phone number specifically selected depending on the mobile operator, with the session code included in the message text.
  Global middleware that controls the special phone number, receives the SMS and stores the associated phone number in a table along with the session code retrieved from message text.
  Support library polls the global middleware passing the session code, waiting for the table to be populated and eventually receiving back the phone number
  A periodic task cleans the table removing old entries and freeing up session codes for reuse.

The support library can be plugged in the original application code by the application developer and the new APK built using the same tool chain used for normal APK compilations, for example within Eclipse. Through this method the original developer can create alternative versions of the APK and use them for distribution outside of Google Play or to provide users alternative in-app payment methods.

In an alternative embodiment, using a unique software algorithm an automated procedure can patch automatically the original APK binary to replace Google support library with the alternative support library, effectively building the new APK automatically without the intervention of the original developers. This algorithm requires the following steps:

a) unpacking of the original APK file to extract internal components.
b) de-compilation of binary DEX file in separate class files.
c) adding proprietary class files implementing the support library.
d) replacement of package name strings to refer to added class file.
e) re-compilation of class files in a DEX file.
f) adding resource files.
g) patching the manifest file with additional elements referring the support library.
h) re-build of the APK file, including generation of a new signature.

Similar automated build procedure can be also used to automatically plug in the manifest file an identification code that can be used to tag different instances of the APK file and track them to different distribution channels.

The support library can also provide a method for tracking installations from different promotional campaign and relate each in-app purchase to the specific advertising partner that generated the app install. When installation of the APK is promoted a specific CampaignID is associated with the source of traffic and advertising partner.

When a user enters the promotional campaign, browsing a specific URL, a set of parameters that characterize the handset are collected and combined in a fingerprint value that is stored in a temporary table, managed by the global middleware, along with the Campaign ID.

This fingerprinting method is not related to cookies, local storage and other tagging methods that only working inside the browser and therefore once the app is downloaded, installed and opened the method can be applied again obtaining the same fingerprint. The first time the app is opened the fingerprint is generated again and used to retrieve the CampaignID from the temporary table. This CampaignID is then stored inside the installed app and used to track back to the global middleware each interesting event, including completed installation of the app, the start of a purchase session and each step of the same session. A table of events is maintained at the global middleware and used to track the history of each user and to notify advertising partners of the events belonging to them.

The support library can also provide a listener for incoming unsolicited notifications generated by the middleware. This listener periodically polls the middleware, even when the app is not open, and retrieves a list of new notifications. Once a new notification arrives this notification is immediately displayed to the user trough the operating system notification system. This messaging channel can be used to wake up the user and encourage additional interaction, to provide useful information, to dispatch advertising messages, to signal that a new version of the APK is available.

The middleware will maintain a table of already installed apps, along with the currently installed version. When a new APK for that app is uploaded in the middleware, the middleware will automatically create notifications for each handset that has a previous version of the app installed. The support library can automatically intercept notifications related to new APK versions and trigger a download of the new APK binary to automatically upgrade the app.

The invention claimed is:

1. A method for implementing in-app software development kits comprising:
   implementing application logics in a programming language compatible with a virtual machine operating system;
   providing one or more proprietary support libraries provided by a first service provider;
   using a software development environment to link the application logics and the proprietary support libraries together, and package them into an Android application package (APK) binary;
   uploading the APK binary to an app market store associated to the first service provider;
   automatically replacing the propriety support libraries provided by the first service provider with additional propriety support libraries provided by the second service providers implementing integration with alternative payment methods in place of the payment method provided by the first service provider; and
   using the said software development environment to link the application logics and the additional proprietary support libraries together in further APK binaries that can be uploaded to alternative app market stores;
   wherein the additional proprietary support libraries comprise one or more of the following function methods:
   function method to determine if a payment is supported depending on the country, the mobile operator and/or the purchase type;
   function method to return a list of product identifiers of already purchased items and their details, and/or to know if an item has been already purchased;
   function method to return a list of all items that can be purchased and their details including price, title, description and purchase type;
   function method to start a purchase flow and allow user interaction within the app;
   function method to mark a purchase as consumed and/or allowing additional purchases of the same item.

2. A system comprising a processor for implementing in-app software development kits comprising at least one of: hardware and middleware configured to carry out a method according to claim 1.

3. The system according to claim 1, comprising a server middleware implemented on a cluster of application servers, configured to dispatching commands to one or more of the following components:
   database of inventory items for an app in a market store;
   database of purchased items for each app and user in a market store;
   definition means of purchase flow for a mobile operator and associated payment method;
   finite-state machine implementing purchase flow through a purchase session;
   database of ongoing purchase sessions and their status;
   connectors and protocol adaptors for a mobile operator and associated payment method;
   JSON API used by SDK;
   reporting log for stats; and
   audit trail.

* * * * *